(12) United States Patent
Neef et al.

(10) Patent No.: US 10,058,810 B2
(45) Date of Patent: Aug. 28, 2018

(54) FILTER DEVICE, IN PARTICULAR AIR FILTER

(71) Applicant: MANN+HUMMEL GMBH, Ludwigsburg (DE)

(72) Inventors: Pascal Neef, Renningen (DE); Mario Rieger, Freiberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 399 days.

(21) Appl. No.: 14/819,965

(22) Filed: Aug. 6, 2015

(65) Prior Publication Data

US 2015/0343359 A1 Dec. 3, 2015

Related U.S. Application Data

(63) Continuation of application No. PCT/EP2014/050733, filed on Jan. 15, 2014.

(30) Foreign Application Priority Data

Feb. 7, 2013 (DE) .................. 10 2013 002 057

(51) Int. Cl.
*B01D 46/00* (2006.01)
*B01D 46/10* (2006.01)
*B01D 46/24* (2006.01)

(52) U.S. Cl.
CPC ....... *B01D 46/0005* (2013.01); *B01D 46/008* (2013.01); *B01D 46/0024* (2013.01); *B01D 46/106* (2013.01); *B01D 46/2411* (2013.01); *B01D 2265/06* (2013.01); *B01D 2275/201* (2013.01); *B01D 2275/206* (2013.01); *B01D 2275/208* (2013.01); *Y10T 29/49732* (2015.01)

(58) Field of Classification Search
CPC .............. B01D 46/0005; B01D 46/008; B01D 46/106; B01D 46/2411; B01D 46/0024; B01D 2275/208; B01D 2275/201; B01D 2265/06; B01D 2275/206; Y10T 29/49732

See application file for complete search history.

(56) References Cited

U.S. PATENT DOCUMENTS

| | | |
|---|---|---|
| 2,853,154 A | 9/1958 | Rivers |
| 3,204,391 A | 9/1965 | Schwab |
| 3,396,517 A | 8/1968 | Schwab |
| 3,691,736 A | 9/1972 | Neumann |
| 3,698,161 A | 10/1972 | Brixius et al. |
| 3,853,510 A | 12/1974 | Burnstein et al. |
| 4,211,543 A * | 7/1980 | Tokar ................. B01D 46/0004 210/484 |
| 5,669,949 A * | 9/1997 | Dudrey .............. B01D 46/0005 55/486 |
| 8,505,286 B2 | 8/2013 | Poppe |

(Continued)

FOREIGN PATENT DOCUMENTS

DE          9306011 U1    6/1993

*Primary Examiner* — Amber Rose Orlando
*Assistant Examiner* — Britanny E. Precht
(74) *Attorney, Agent, or Firm* — James Hasselbeck

(57) ABSTRACT

A filter device comprises an inner filter element and an outer filter element, which can be inserted into each other, wherein the outer filter element comprises a supporting frame that is the carrier of a filter medium of the filter element, and the inner filter element is supported on the supporting frame of the outer filter element.

12 Claims, 3 Drawing Sheets

(56) References Cited

U.S. PATENT DOCUMENTS

| | | | |
|---|---|---|---|
| 2006/0081528 A1* | 4/2006 | Oelpke | B01D 46/008 210/493.1 |
| 2006/0107836 A1* | 5/2006 | Maier | B01D 46/0024 96/134 |
| 2009/0031682 A1 | 2/2009 | Langlands et al. | |
| 2010/0242425 A1* | 9/2010 | Swanson | B01D 46/2411 55/498 |
| 2011/0000458 A1* | 1/2011 | Muenkel | B01D 46/0021 123/198 E |
| 2014/0014597 A1* | 1/2014 | Knight | B01D 29/50 210/806 |
| 2014/0237957 A1* | 8/2014 | Kohn | B01D 46/0016 55/341.1 |
| 2014/0290194 A1* | 10/2014 | Muenkel | B01D 46/0024 55/482 |
| 2015/0343359 A1* | 12/2015 | Neef | B01D 46/0024 55/495 |
| 2016/0101380 A1* | 4/2016 | Pereira Madeira | B01D 46/0041 55/503 |
| 2016/0101382 A1* | 4/2016 | Wagner | B01D 46/103 55/495 |
| 2016/0129384 A1* | 5/2016 | Schulz | B01D 29/213 55/482 |
| 2016/0129385 A1* | 5/2016 | Schulz | B01D 46/521 55/482 |
| 2016/0131094 A1* | 5/2016 | Pereira Madeira | F02M 35/02425 96/414 |
| 2017/0252691 A1* | 9/2017 | Johnson | B01D 46/002 |

* cited by examiner

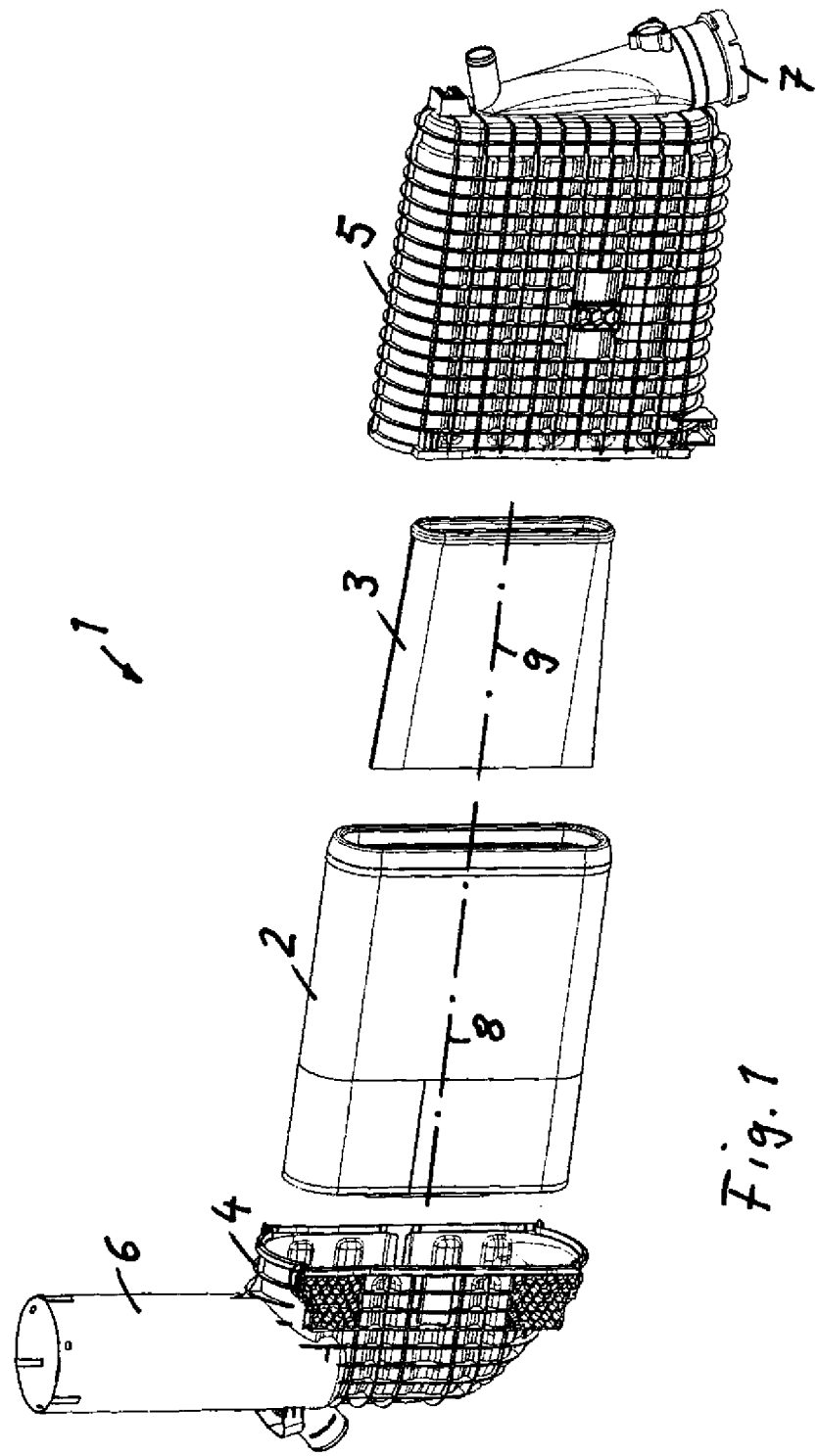

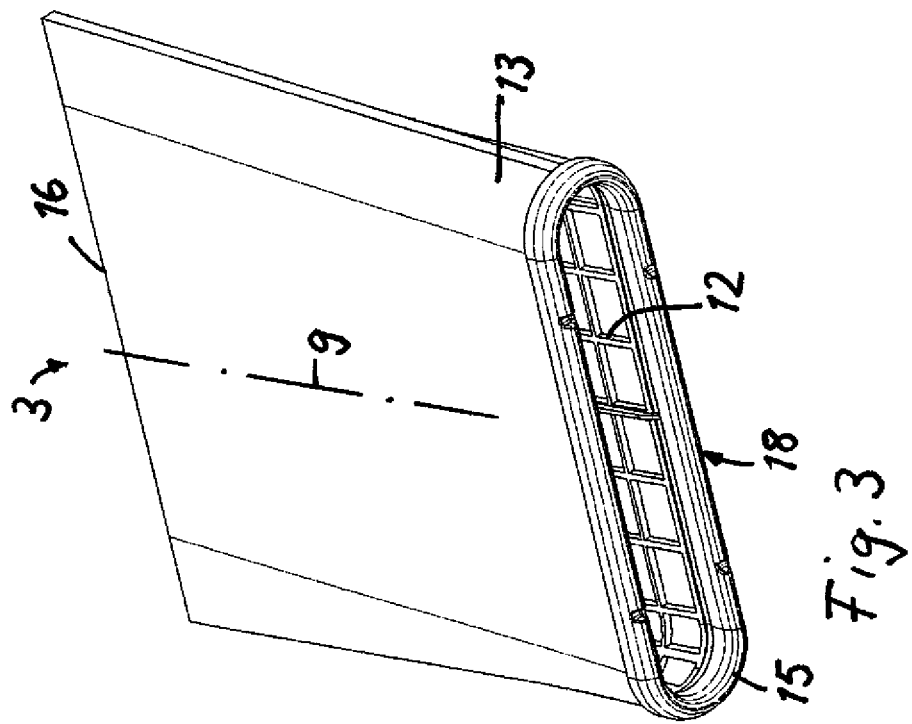
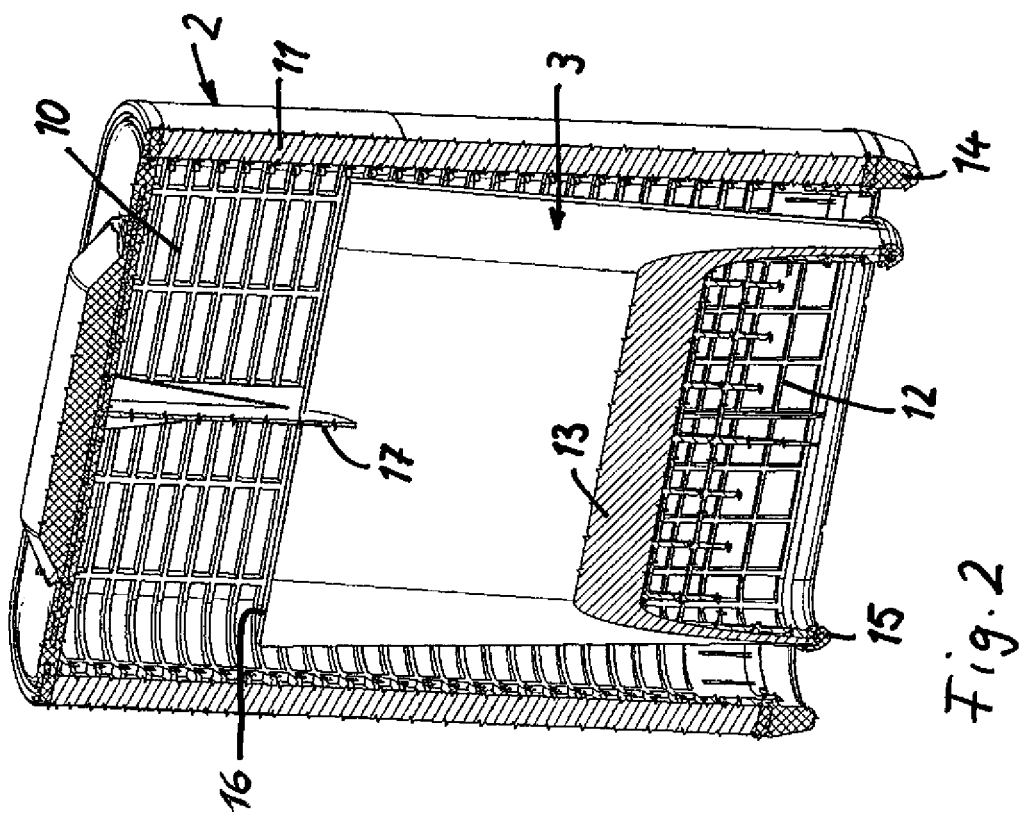

FILTER DEVICE, IN PARTICULAR AIR FILTER

TECHNICAL FIELD

The invention relates to a filter device having an outer filter element and an inner filter element, which can be mounted inside each other, according to the preamble of claim 1.

BACKGROUND

U.S. Pat. No. 3,853,510 describes an air filter comprising an inner filter element and an outer filter element, which can be inserted into each other to implement two-stage filtration. Both the inner filter element and the outer filter element are provided with a respective wedge-shaped filter medium that is tapered toward an end face, wherein the outer filter medium is larger than the inner filter element, so that an intermediate space between the inner and outer filter media is enclosed. The wedge angles of the inner and outer filter media are identical.

U.S. Pat. No. 3,204,391 also describes an air filter having an inner filter element and an outer filter element, which can be inserted into each other and each have a tapered design across the axial lengths thereof. The cone angle of the filter elements differs, so that an intermediate space having a variable cross-sectional geometry is formed between the inner and outer filter elements.

SUMMARY OF THE INVENTION

The object of the invention is to implement a filter device having inner and outer filter elements in a simple design in such a way that not only high filtration performance is ensured, but also sufficient reliability against dirt accumulation on the outflow side of the filter device.

This object is achieved according to the invention by a filter device, in particular for the intake air of an internal combustion engine, having an outer filter element and an inner filter element, wherein the outer and inner filter elements are designed separately and can be mounted inside each other, and the inner filter element has a variable cross-sectional shape across the length thereof, wherein the outer filter element comprises a supporting frame that is the carrier of a filter medium of the filter element, wherein the inner filter element is supported on the supporting frame of the outer filter element. The inner filter element can preferably have a linear end face.

The filter device according to the invention is preferably a gas filter, in particular an air filter, which is used in motor vehicles, preferably to filter the air to be supplied to the internal combustion engine or the fresh air to be supplied to the vehicle cabin. In principle, however, filtration of liquid media is also possible, for example a use as a fuel filter or an oil filter.

The filter device comprises two separately designed filter elements that can be inserted into each other and that differ from each other in the cross-sectional shapes thereof based on the longitudinal filter element axis. In the assembled state, the longitudinal axes of the two filter elements preferably extend coaxially, however at least in parallel, wherein an intermediate space is formed between the inner filter element and the outer filter element, the cross-sectional area of the intermediate space optionally varying across the axial length, based on the longitudinal axes of the first and second filter elements.

The inner filter element and the outer filter element ensure increased reliability against dirt accumulation on the outflow side of the filter device. When used as an air filter for an internal combustion engine, it can be ensured, even when removing the outer filter element, that no dust or dirt particles can enter the intake system of the internal combustion engine; the dust is, or the dirt particles are, filtered out at the inner filter element. This allows the outer filter element to be removed, for example for cleaning purposes, even under difficult outer conditions, and to be reattached after cleaning, without the risk of dirt entering the clean side of the filter device.

The inner filter element, which has a variable cross-sectional shape across the length thereof, assumes a position in the interior of the outer filter element when mounted and is supported directly or indirectly on an inner supporting frame of the outer filter element. The supporting frame of the outer filter element is the carrier of a filter medium typically located on the outer side of the supporting frame, which is to say on the side facing away from the inner filter element. The supporting design via the supporting frame allows a force to be transmitted from the accommodating filter housing of the filter device, via the outer filter element, to the inner filter element, which is thus held securely in the position thereof over a long operating period and under difficult conditions.

When mounting the filter device, advantageously first the inner filter element is inserted into the accommodating housing, and then the outer filter element is installed, which by way of the supporting frame supports the inner filter element and secures the same in the target position. The inner and outer filter elements are inserted into an accommodating space in the filter housing, which is to be closed by a housing cover. When the housing cover is closed, the supporting force acts in the axial direction, which is to say in parallel to the longitudinal extension of the inner or outer filter element. The supporting forces are transmitted between the bottom of the accommodating housing and the housing cover via the inner and outer filter elements. The filter elements support each other, whereby the combination of inner and outer filter elements has higher stability.

The flow through the outer and inner filter elements preferably takes place in the transverse direction in relation to the longitudinal axis of the filter elements. The fluid to be purified usually flows first through the outer filter element, and then flows through the inner filter element, so that the clean side of the inner filter element at the same time forms the outflow side of the filter device.

According to a preferred embodiment, the inner filter element is supported on a supporting part, such as a protrusion provided on the supporting frame, and is designed in particular in one piece with the supporting frame. The protrusion is designed to be V-shaped or U-shaped, for example, and encloses an end face of the inner filter element when the filter is mounted. The inner filter element is accommodated and held in a form-locked manner in the U- or V-shaped seat of the protrusion.

It is furthermore advantageous for the geometries of the inner and outer filter elements to be selected in such a way that the flow and concentration conditions in the intermediate space between the inner filter element and the outer filter element can ensure improved incident flow to the inner filter element, for example due to a non-constant cross-sectional area of the intermediate space, whereby during regular operation, which is to say when the inner and outer filter elements are inserted into each other, uniform incident flow to the inner filter element, and thereby reduced flow resistance, can be achieved.

According to a preferred embodiment, the outer filter element has a constant cross-sectional shape, and the inner filter element has a variable cross-sectional shape. However, it is also possible to provide the outer filter element with a variable cross-sectional shape. The intermediate space between the inner and outer filter elements preferably has a non-constant cross-sectional area; if the inner and outer filter elements are congruently arranged, the intermediate space may also have a constant cross-sectional area.

The two filter elements are advantageously designed as hollow filters, through which the fluid flows radially, in particular radially from the outside to the inside. If the outer filter element is designed to have a constant cross-sectional shape, the element is preferably designed as a ring filter having a hollow cylindrical shape, or having an elongated or oval cross-section.

Moreover, it is advantageous for the inner filter element to also comprise a supporting frame that is the carrier of a filter medium of the filter element. The inner filter element is produced, for example, by first placing the filter medium, which is optionally appropriately prefabricated in the later shape thereof, in particular by bonding, sewing or welding, into the supporting frame. Subsequently, an end-face seal can be created by immersing the combination made of the supporting frame and filter medium into a liquid sealant, such as PUR (polyurethane), so that a peripheral sealing ring is formed on the end face.

The inner filter element having the variable cross-sectional shape advantageously has a continuously tapering cross-section and is designed to be wedge shaped, for example. In the region of the tapered end face, the filter element can have a linear shape; the filter means is advantageously designed to be closed in this position. Closing takes place either mechanically or by welding, such as ultrasonic welding, or by gluing. The filter element can be introduced more easily into the outer filter element in the region of the smallest cross-section on one of the end faces of the filter element. Supporting advantageously takes place on the tapered, optionally linear, end face.

In the case of incident flow to the filter device from the outside to the inside, the outer filter element advantageously forms a primary filter element, and the inner filter element forms a secondary filter element, which is provided in particular for protection reasons so as to increase the reliability against dirt accumulation on the outflow side of the filter device.

The invention further relates to a filter element for use as an inner filter element in a filter device as was already described above, wherein the element has a variable cross-sectional shape across the length thereof and is preferably designed in such a way that it can be mounted inside an outer filter element, which in the interior thereof comprises a supporting frame that is the carrier of a filter medium of the outer filter element, wherein the inner filter element is designed in such a way that it can be supported on the supporting frame of the outer filter element.

The invention further relates to a method for replacing an outer filter element and/or an inner filter element in a filter device as was already described above, the filter device comprising a housing, an outer filter element and an inner filter element, wherein the outer filter element and the inner filter element are designed separately and can be mounted inside each other, and the inner filter element has a variable cross-sectional shape across the length thereof, wherein the outer filter element comprises a supporting frame that is the carrier of a filter medium of the outer filter element, comprising the following steps:

removing the outer filter element from the housing, which has previously been opened;

then optionally removing the inner filter element from the housing;

then optionally installing a new inner filter element; and then installing the previously removed, or a new, outer filter element, wherein the inner filter element is supported on the supporting frame of the outer filter element.

BRIEF DESCRIPTION OF THE DRAWINGS

Further advantages and advantageous embodiments will be apparent from the remaining claims, the description of the figures, and the drawings. In the drawings:

FIG. 1 shows an exploded view of an air filter for an internal combustion engine, comprising an inner filter element and an outer filter element, wherein the inner filter element has a wedge shape, and the outer filter element has a constant cross-section across the axial length thereof, having an elongated cross-sectional shape;

FIG. 2 shows a partially cut illustration of the inner and outer filter elements when mounted;

FIG. 3 shows a perspective individual illustration of the inner filter element;

In the figures, identical components are denoted by the same reference numerals.

DETAILED DESCRIPTION OF THE INVENTION

Figure 6:
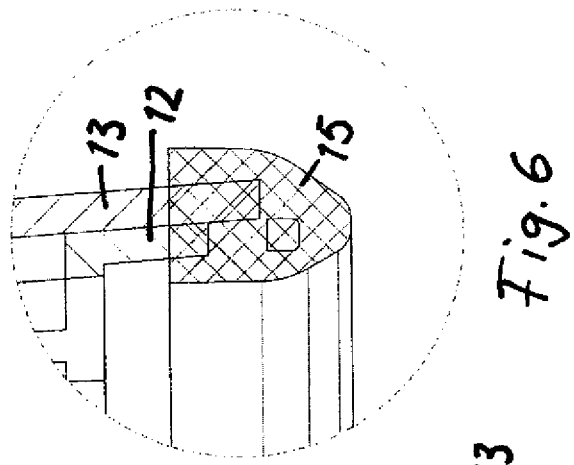
FIG. 6 shows an enlarged illustration from the end-face region of the inner filter element having a peripheral seal.

FIG. 1 shows a filter device 1 that is designed as an air filter for an internal combustion engine. The filter device 1 comprises, as filter elements, a first, outer filter element 2, which forms a primary filter element, and a second, inner filter element 3, which is designed as a secondary filter element. The outer and inner filter elements 2, 3 are designed separately from each other and are inserted into each other during assembly. The filter elements 2, 3 are accommodated in a housing comprising two housing parts 4 and 5 to be mechanically joined, wherein an inflow connector 6 for the fluid to be purified is provided on the housing part 4, and an outflow connector 7 for discharging the purified fluid is integrally formed on the housing part 5. The fluid to be purified flows through the two filter elements 2, 3 radially from the outside to the inside. The outer filter element 2 has a constant cross-sectional shape across the axial length thereof in the direction of the longitudinal axis 8, while the inner filter element 3, which is wedge-shaped, has a non-constant cross-sectional shape across the axial length thereof along the longitudinal axis 9. The narrow end face of the inner filter element 3 faces the housing part 4 comprising the inflow connector 6. The axial length of the outer filter element 2 is greater than that of the inner filter element 3.

FIG. 2 shows the outer filter element 2 and inner filter element 3 when inserted into each other. The outer filter element 2 comprises a supporting frame 10, which is advantageously made of plastic material, and a filter medium 11, which is carried by the supporting frame 10. In corresponding fashion, the inner filter element 3 is also provided with a supporting frame 12 and a filter medium 13. The inner filter element 3 is introduced completely into the interior of the outer filter element 2, wherein the larger end face of the inner filter element 3 is located together with the open end face of the outer filter element 2 in one plane. In the region of the open end face a sealing element 14 is integrally formed onto the filter medium 11 of the outer filter element 2, and a sealing element 15 is integrally formed onto the filter medium 13 of the inner filter element 3.

The closed, linear end face 16 of the inner filter element 3 is supported on the supporting frame 10 of the outer filter element 2. For this purpose, the supporting frame 10 of the outer filter element 2 has a protrusion 17, which extends over the end face 16 of the inner filter element 3.

The through-flow direction extends radially from the outside to the inside. Initially, the flow occurs through the outer filter element 2 radially from the outside to the inside, wherein the fluid purified in the filter medium 11 finds its way into the intermediate space between the inner side of the outer filter element 2 and the outer side of the inner filter element 3. The fluid can then flow from the intermediate space through the inner filter element 3 radially to the inside, wherein the interior of the inner filter element 3 forms the clean side communicating with the outflow connector 7 (FIG. 1) in the filter housing. The outflow of the purified fluid from the interior of the inner filter element 3 takes place in the axial direction via the open end face.

Figure 5:
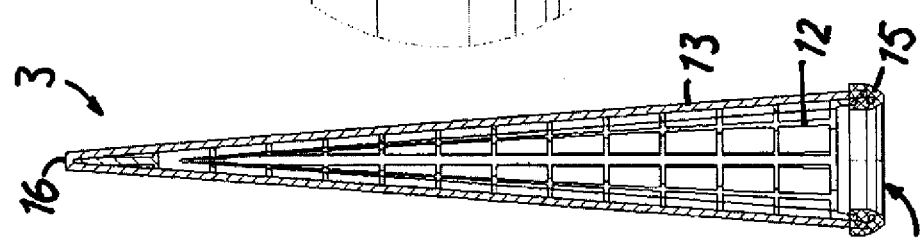
FIG. 5 shows a longitudinal section of the inner filter element in a further cutting plane.
Figure 4:
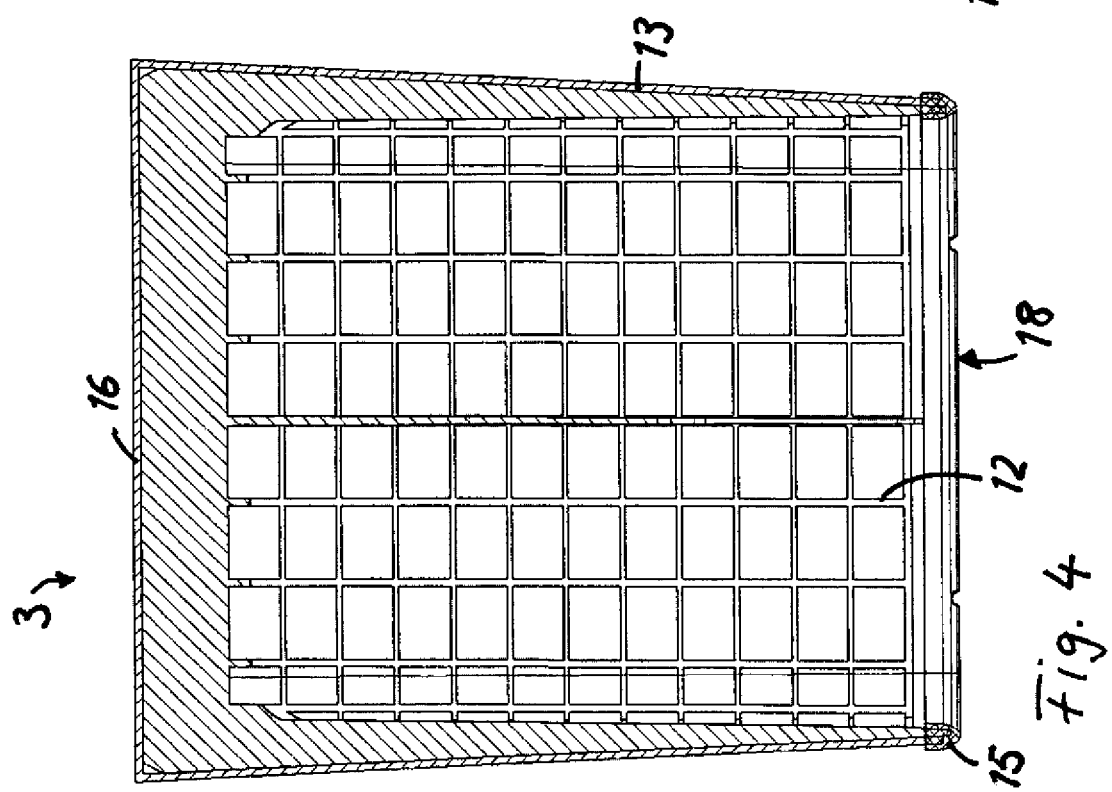
FIG. 4 shows a longitudinal section of the inner filter element.

The following FIGS. 3 to 6 concern the inner filter element 3. The filter element 3 has a closed design in the region of the narrow end face 16, and the filter element 3 has an open design only in the region of the opposing, enlarged end face 18. As a result of the wedge shape, the open end face 18 has the largest cross-section along the longitudinal axis 9, and the closed end face 16 has the smallest cross-section. The cross-sectional shape in the region of the open end face 18 is adapted to the cross-sectional shape of the outer filter element 2, wherein the cross-sectional area in the region of the end face 18 is designed to be smaller than the interior of the outer filter element 2 so as to allow the inner filter element 3 to be introduced into the interior of the outer filter element 2. The filter element 3 widens along the longitudinal axis 9 up to the narrow end face 16, which has the largest extension transversely to the longitudinal axis 9. This extension is adapted to the interior of the outer filter element 2 so as to ensure unobstructed introduction of the inner filter element 3 into the filter element 2.

The inner filter element 3 is produced by first prefabricating the filter medium 13, for example preshaping it into a bag by way of gluing, sewing or welding, and then placing it onto the supporting frame 12. In a subsequent step, the open end face 18 can be immersed into a liquid sealant, such as polyurethane, whereby the peripheral sealing element 15 is formed on the end face 18. As is apparent from the enlarged illustration according to FIG. 6, the sealing element 16 surrounds the end faces of both the supporting frame 12 and of the filter medium 13 and thereby connects the supporting structure and the filter medium.

In the region of the upper narrow end face 16, the filter medium 13 has a closed design. Closing takes place either mechanically, optionally by sewing, or by welding, for example, such as ultrasonic welding.

What is claimed is:

1. A filter device, comprising:
   an outer filter element having an open interior that opens to an exterior at a first axial end face; and
   an inner filter element having an open interior an open interior that opens to an exterior at a first end face, the inner filter element separate from the outer filter element;
   wherein the inner filter element is configured to be mountable into the open interior of the outer filter element;
   wherein the inner filter element has an axial length;
   wherein the inner filter element has cross-sectional shape that varies along the axial length;
   wherein the outer filter element comprises
      a filter medium;
      a supporting frame on which the filter medium is arranged, the supporting frame carrying the filter medium;
   wherein the inner filter element is supported on the supporting frame of the outer filter element;
   wherein the inner filter element has a linear end face arranged axially opposite from the first end face of the inner filter element;
   wherein the supporting frame of the outer filter element includes
      a radially inwardly projecting protrusion formed on the support frame and projecting into the open interior of the outer filter element;
      wherein the radially inwardly projecting protrusion has a U-shaped or V-shaped seat formed as an indent into an axial end of the radially inwardly projecting protrusion, the U-shaped or V-shaped seat configured to receive and support the linear end face of the inner filter element into an interior of the U-shaped or V-shaped seat;
      wherein the U-shaped or V-shaped seat extends over the linear end face of the inner filter, such that:
      a first side of the U-shaped or V-shaped seat contacts a first radial outer side of the inner filter element;
      an opposite second side of the U-shaped or V-shaped seat contacts an opposite second radial outer side of the inner filter element.

2. The filter device according to claim 1, wherein the linear end face of the inner filter element is a closed end face.

3. The filter device according to claim 1, wherein the inner filter element has a continuously tapering cross-section along the axial length of the inner filter element.

4. The filter device according to claim 3, wherein the inner filter element is a wedge-shaped filter element.

5. The filter device according to claim 1, wherein the outer filter element has a constant cross-sectional shape across an axial length thereof.

6. The filter device according to claim 5, wherein the outer filter element having the constant cross-sectional shape is configured as a ring filter.

7. The filter device according to claim 1, wherein the outer filter element has a variable cross-sectional shape across an axial length thereof.

8. The filter device according to claim 1, wherein the inner filter element further comprises
   a filter medium;
   a supporting frame on which the inner filter element filter medium is arranged, the supporting frame carrying the filter medium.

9. A filter element for use in a filter device according to claim 1, the filter element comprising a filter medium;
a supporting frame arranged in an interior of the filter element, the filter medium carried on the supporting frame;
wherein the supporting frame includes
a radially inwardly projecting protrusion formed on the support frame and projecting into an open interior of the filter element;
wherein the radially inwardly projecting protrusion has a U-shaped or V-shaped seat formed as an indent into an axial end of the radially inwardly projecting protrusion, the U-shaped or V-shaped seat configured to receive and support an end face of an inner filter element receivable into the open interior.

10. An inner filter element for use in a filter device according to claims 1,
wherein the inner filter element has an axial length;
wherein the inner filter element has cross-sectional shape that varies along the axial length;
wherein the inner filter element has a linear end face at an axial end of the inner filter element, where radially opposite outer sides of the inner filter element join and directly contact against each other to close the linear end face;
wherein the inner filter element is configured to be mountable into an open interior of an outer filter element having:
a supporting frame that is the carrier of a filter medium of the outer filter element;
a radially inwardly projecting protrusion having a U-shaped or V-shaped seat into which the linear end face of the inner filter element is received and supported;
wherein the inner filter element if configured to be supported on the supporting frame of the outer filter element within the open interior of the outer filter element.

11. A method for replacing an outer filter element and/or an inner filter element in a filter device according to claim 1, wherein
the filter device comprises
a housing;
an outer filter element arranged in the housing;
an inner filter element arranged in an open interior of the outer filter element, the inner filter element having a linear end face (16) at an axial end of the inner filter element;
wherein the outer and inner filter elements are embodied separately;
wherein the inner filter element is configured to be mountable into the open interior of the outer filter element;
wherein the inner filter element has an axial length;
wherein the inner filter element has cross-sectional shape that varies along the axial length;
wherein the inner filter element has a linear end face arranged axially opposite from the first end face of the inner filter element;
wherein the outer filter element includes a supporting frame that is a carrier of a filter medium of the outer filter element;
wherein the supporting frame of the outer filter element includes
a radially inwardly projecting protrusion formed on the support frame and projecting into the open interior of the outer filter element;
wherein the radially inwardly projecting protrusion has a U-shaped or V-shaped seat formed as an indent into an axial end of the radially inwardly projecting protrusion, the U-shaped or V-shaped seat configured to receive and support the linear end face of the inner filter element into an interior of the U-shaped or V-shaped seat;
wherein the U-shaped or V-shaped seat extends over the linear end face of the inner filter, such that:
a first side of the U-shaped or V-shaped seat contacts a first radial outer side of the inner filter element;
an opposite second side of the U-shaped or V-shaped seat contacts an opposite second radial outer side of the inner filter element;
the method of replacing comprising the steps of:
removing the outer filter element from the housing, which has previously been opened;
then installing the previously removed, or a new, outer filter element in the housing; and
supporting the inner filter element on the supporting frame of the outer filter element by inserting the liner end face of the inner filter element into the U-shaped or V-shaped seat of the radially inwardly projecting protrusion.

12. The method according to claim 11, wherein
after the step of removing the outer filter element from the housing, the method further comprises:
then, removing the inner filter element from the housing;
then installing a new inner filter element in the housing.

* * * * *